United States Patent
Frey et al.

(10) Patent No.: US 6,539,090 B1
(45) Date of Patent: Mar. 25, 2003

(54) GENERALIZED ARRANGEMENT FOR ROUTING TELECOMMUNICATIONS CALLS

(75) Inventors: Alan Eugene Frey, Naperville, IL (US); Susan Jean Tripp, Warrenville, IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/167,617

(22) Filed: Oct. 6, 1998

(51) Int. Cl.[7] ............................................. H04M 7/00
(52) U.S. Cl. .................... 379/230; 379/229; 379/245; 379/246
(58) Field of Search ................ 379/207.02, 207.11, 379/207.12, 207.14, 211.02, 213.01, 220.01, 230, 93.23, 221.13, 221.14, 232, 242, 245, 246

(56) References Cited

U.S. PATENT DOCUMENTS

| | | | |
|---|---|---|---|
| 4,191,860 A | | 3/1980 | Weber ....................... 179/18 B |
| 4,644,528 A | * | 2/1987 | Ahmad et al. ............... 370/378 |
| 5,206,901 A | * | 4/1993 | Harlow et al. .......... 379/211.04 |
| 5,226,075 A | * | 7/1993 | Funk et al. .................. 379/243 |
| 5,237,604 A | * | 8/1993 | Ryan ....................... 379/221.14 |
| 5,333,188 A | * | 7/1994 | Bogart et al. .......... 379/221.14 |
| 5,483,586 A | * | 1/1996 | Sussman ................. 379/218.01 |
| 5,586,177 A | * | 12/1996 | Farris et al. ................. 379/230 |
| 5,694,463 A | | 12/1997 | Christie et al. ............. 379/230 |
| 5,724,411 A | * | 3/1998 | Eisdorfer et al. ......... 379/93.23 |
| 5,764,745 A | * | 6/1998 | Chan et al. ............ 379/221.13 |
| 5,802,160 A | * | 9/1998 | Kugell et al. ................ 379/211 |
| 5,805,688 A | * | 9/1998 | Gillespie et al. ....... 379/221.08 |
| 6,021,126 A | * | 2/2000 | White et al. ................. 370/352 |
| 6,130,941 A | * | 10/2000 | Nimmagadda et al. ..... 379/230 |
| 6,298,126 B1 | * | 10/2001 | Kawecki et al. ............ 379/126 |

FOREIGN PATENT DOCUMENTS

| | | | |
|---|---|---|---|
| EP | 0687118 | 12/1995 | ............ H04Q/7/38 |
| WO | 9818268 | 4/1998 | ............ H04Q/3/00 |

OTHER PUBLICATIONS

Lautenschlager et al.; "Routing Service for the Provision of Number Portability", ISS[97]Symposium, 9/97 pp 235–242.
I, C–L et al.: "PCS Mobility Management Using the Reverse Virtual Call Setup Algorithm"; IEEE/ACM Trans. in Networking V.5, n1, 2/97 pp 13–23.
Committee T1–Telecommincations: T1S1. 3/98–98–08701, Contributions ATM Dynamic Trunks—8/31–Sep. 4, 1998, Dallas, TX, pp. 1–4.

\* cited by examiner

*Primary Examiner*—Ahmad F. Matar
*Assistant Examiner*—Bing Bui
(74) *Attorney, Agent, or Firm*—Werner Ulrich

(57) ABSTRACT

Apparatus and a method for controlling the establishment of telecommunications calls. In response to a service request from a calling party, a switch serving the calling party transmits a query identifying the called party to a shared database. The database provides information identifying the switch for accessing the called party, and information for identifying port(s) for accessing the called party from that switch. When a customer moves from one location to another, the database is updated to reflect the switch and port identification associated with the new location of the customer. If the called customer is a mobile customer, the database maintains information concerning the current location of that customer so that calls can be immediately switched to that customer. Advantageously, a single database for storing information about the location and class of service of all customers served by a network greatly simplifies the process of routing calls, allows for great flexibility in numbering plans, and greatly simplifies the process of providing service to a customer who has moved.

46 Claims, 2 Drawing Sheets

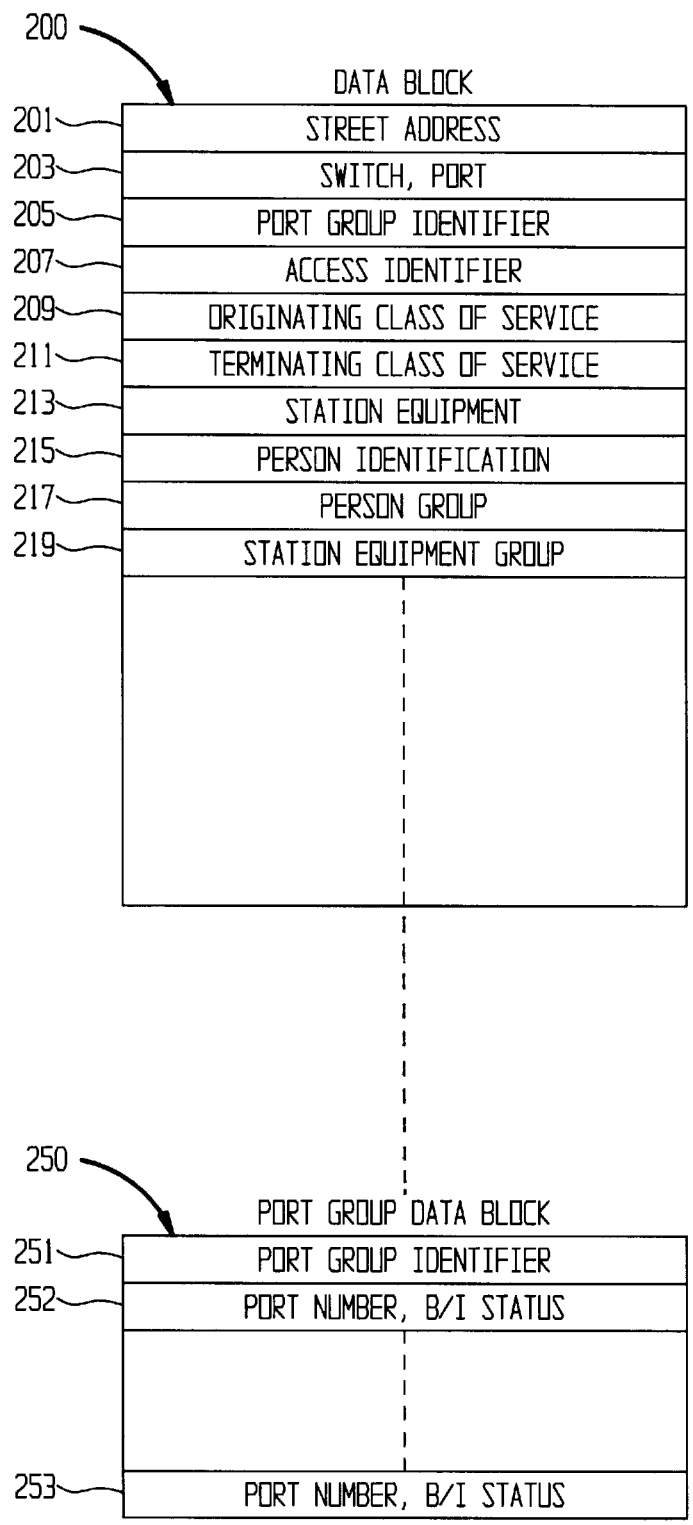

GENERALIZED ARRANGEMENT FOR ROUTING TELECOMMUNICATIONS CALLS

TECHNICAL FIELD

This invention relates to arrangements for routing telephone calls and more specifically, for such arrangements making use of a centralized database.

PROBLEM

Telephone call routing has traditionally been accomplished through the use of small telephone numbers that specify a destination. In the North American numbering plan, a three digit area code specifies a region, a second three-digit code specifies a switching system within that region, and the last four digits specify a subscriber connected to that switch. The process of routing a call is thereby accomplished by routing the call to a toll switch within the specified region (and in some cases, using six-digit translation, to route the call to one of several such toll switches). Routing the call then, from that toll switch directly or indirectly to the switching system specified by the office code, and then, in that switching system, based on local translations, routing the call to the destination customer.

A number of problems with this simple arrangement have become apparent in the last several decades. For example, as "800" calling became popular, it was necessary that calls to an "800" number could be routed any place in the country. The problem was solved by implementing a database to translate from an "800" number to a conventional POTS, (plain old telephone service) number, and routing to that conventional telephone number. In a similar way, software defined networks were implemented to allow customers within a business to use an internal numbering plan to access other telephones of a business via the public switched telephone number by having a database to translate between internal telephone numbers, and POTS numbers.

The introduction of competition into the telecommunications business has further created problems. One of the desirable features that is being implemented with the introduction of competition, is local number portability wherein a customer may switch to being served by another service provider without changing the customer's telephone number. Thus, a range of telephone numbers which formerly were associated with a single switch, may now be served by two or more switches. Proposed solutions to this problem have generally involved the use of a database to identify the switch serving a particular telephone number, and arranging to route the call to that switch, or by initially routing the call to the switch of the main carrier, and then re-routing the call to the switch of the carrier actually serving the terminating customer.

In recent years, the Internet network has grown. Using the facilities of the Internet network, an Internet name (e.g., e-mail address), or other handle is translated in a database into an Internet protocol address for transmitting Internet datagrams to the destination specified by the name.

SOLUTION

Applicants have recognized that there are major shortcomings to the status quo for routing calls to a destination customer. First, translations are performed in all intermediate switches as a call is advanced from source to destination. The object of these translations is to determine the best route for connecting the call to the destination switch. Second, the process of providing telephone service to a customer that moves is costly, time consuming, and awkward. If the customer moves from one switch to another, the customer's number generally is changed, which is undesirable. Even if the customer stays within the same switch, and/or retains the same telephone number, the administration of the change, and the change of translation data for that customer in a specific switch out of the hundreds of switches served by a service order bureau is time consuming; all the customer's special service needs must be re-specified for the new switch and customer port. Whereas plans are being made which can accommodate number portability, within a selectively local area, the problems of allowing complete number portability throughout the nation are so formidable that practically speaking, nationwide number portability cannot be implemented using the present routing and translation arrangements. Third, special number blocks must be reserved for customers who have special terminating service, accessed by special access codes, such as "800 numbers, and "900" numbers. The need for additional "800" numbers, for example, has already required the setting aside of two additional area codes for this purpose. Sometimes this has been helpful, since for example, customers know when dialing an "800" number they will not be charged for the call; however, as new, more specialized services are introduced, it will be awkward to require the setting aside of a new NPA code for each of these services. Fourth, the use of 800 and 900 numbers requires a special database dedicated to the function of translating to POTS numbers, a database which must be maintained along with the supporting local switch databases. Fifth, the current arrangement requires customers to be assigned one or more POTS numbers corresponding to 800, etc., numbers, thus using up these POTS numbers. Sixth, there is no facility for assigning a handle such as an Internet name to a customer being routed over the public switched telephone network, (PSTN). Seventh, special translations are required for routing calls to special announcements, mail boxes, call prompt menus, and services such as a "meet me" conference switch.

Applicants have analyzed these problems and have come up with a generalized solution which represents a significant advance over the prior art. In accordance with their invention, a centralized database is consulted for routing calls; this centralized database makes a translation between an access identifier such as the called number, name or other handle, (e.g,. e-mail address), and a destination switch. In accordance with Applicants' preferred embodiment, the translation further provides an identification of the terminating port or port group by means of which the destination switch can access the destination terminal. A port as used herein is an outlet from a switch that carries telecommunication signals to or from a user. It can be, for example, a line port connected to a customer line, a trunk port connected to a PBX, (Private Branch Exchange) or another switch, a port on a subscriber loop carrier, remote concentrator or remote switching unit connected to the terminating switch 1, a local area network port, or a radio link for accessing a wireless customer. Advantageously, using such an arrangement, a user can be connected to any switch regardless of the user's access identifier.

In accordance with the preferred embodiment, calls to a number can be connected to a customer at any port of any switch, including a port for serving a wireless device. Advantageously, this permits customers who move to specify the new street address at which their telecommunications terminal is now connected; using a database to translate between any street address and the corresponding port and switch, by specifying a new street address to the database, the customer effectively specifies the switch and port to which calls for their telephone should be routed. The term "street address" as used herein, also includes an internal apartment, room, or office number, for the case of a building occupied by multiple parties.

In accordance with one feature of Applicants' invention, the full terminating translation is stored in the centralized database. Advantageously, this arrangement bypasses the need for a special translation from an 800 or 900 number to a POTS number, followed by routing a call using the POTS number. Instead the 800 number is translated to the identity of the terminating switch, and terminating port or port group. The translation can still provide the flexible arrangements for special access codes such as 800 or 900 number type calls which allow for variations in the selection of a terminating port, or port groups, according to the time of day, day of week, location, and/or identity of the calling party, traffic load, or language preference of the caller. Further, this type of arrangement offers the kinds of service previously available only to 800 or 900 numbers to customers with any number. Further, call forwarding service can be provided without first routing a call to the switch serving the home base of a customer.

In accordance with another feature of Applicants' invention, calls to wireless devices can readily be completed. The database keeps track of the location where mobile customer's device can be found. This is essentially the function performed by the VLR, (visitor location register), in the GSM, (Global Standard for Mobiles), standard. Using arrangement of Applicants' invention, the database can route a call to the switch currently serving a mobile customer and that switch can be told the identity of the paging region wherein the customer's device should be paged. Advantageously, this arrangement not only permits the centralized database to absorb functions of the VLR database, but also allows calls to be directly routed to the correct mobile switching center for completion of the call to the destination customer's device.

In accordance with another feature of Applicant' preferred embodiment, all service data of the destination customer which are pertinent to the routing and billing of the call are maintained in the database.

In accordance with another feature of Applicants' invention, the originating class of service is maintained in the database. Advantageously, this arrangement allows all translation information for customers to be stored at the centralized database, and avoids the requirement for maintaining a customer database in each switch.

In accordance with another aspect of Applicants' invention, if the called customer is served by a different network carrier, then the translation in the database provides the identity of the switch of this carrier that can be used to access the carrier which serves the called customer for calls to the requested destination, and the identity of the trunk group between the switch and that carrier that can be used for completing the call.

In accordance with another feature of Applicant' invention, when a called customer is served by a different network carrier, the database maintains the busy/idle status of the in-service trunks, which may be spread over several switches, for accessing a desired access switch of the other carrier, and the database then selects the intercarrier access switch and the trunk of that switch to be used for this connection. Advantageously, no delay is incurred for falsely routing a call to a switch, all of whose access trunks are busy, and then re-routing the call to another switch.

In accordance with Applicants' preferred embodiment, the single centralized database is realized as a distributed database. The partitions include partitions for subsets of customers. A different carrier is treated essentially as if it were a customer, and the database for that carrier customer maintains the busy/idle status of trunks for accessing that carrier customer, and the class of service for accessing that carrier customer.

BRIEF DESCRIPTION OF THE DRAWING

FIG. 2 is a memory layout of data stored in the centralized database.

DETAILED DESCRIPTION

Figure 1:
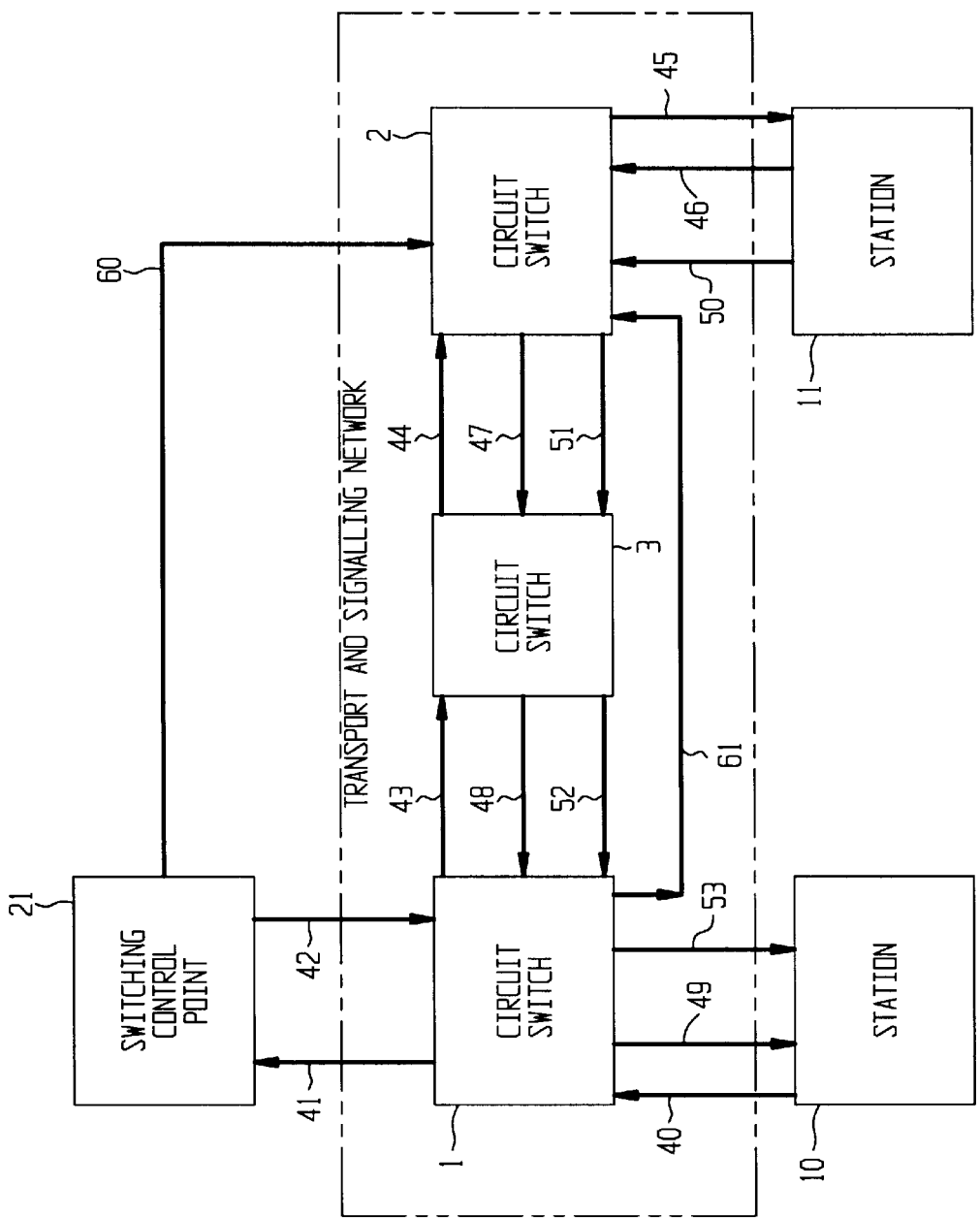
FIG. 1 is a block diagram illustrating the operation of Applicants' invention.

FIG. 1 is a block diagram illustrating the operation of Applicants invention. FIG. 1 illustrates the various messages for actions required to establish a connection between calling customer telephone station 10, and called customer telephone station 11. The connection will be set up from an originating switch 1 connected to the calling customer, and from a terminating switch 2 connected to the called customer telephone 11, and the connection will be via switch 3 which is being used to interconnect switches 1 and 2. In this example, both the calling and the called customers have an ISDN station. The calling station sends an initial set-up message, giving the identity of the preferred port, (B-channel), to be used for the connection, a call reference number, and the called party number. In response, switch 1 sends an inquiry message 41, to the database; in this case, specifically to a switching control point 21, providing the identity of the requesting switch, the identity of the selected port, (B-channel), connected to the calling station, the call reference number, and the called party number. In response, the SCP sends a route call message containing the called party number, the switch (S2) for accessing the called party, the port on switch 2 connected to the called customer telephone station 11, the identity of switch 1, the calling party port number, and the calling party call reference number.

Switch 1 recognizes that the call terminates on switch 2, and determines a route for the call. In the particular example, the route is via switch 3. Switch 1 then hunts for a trunk to switch 3.

Switch 1 then transmits an initial address message (IAM) 43 to switch 3, including the identity of the trunk from switch 1 to switch 3, the identity of switch 2, the switch for serving the called party, the identity of the port at switch 2 connected to the called party telephone 11, and the called party number. The term port as used herein includes for example, a line port connected to a customer line, a trunk port connected to a PBX, (Private Branch Exchange) or another switch, a port on a subscriber loop carrier, remote concentrator or remote switching unit connected to the terminating switch 1, a local area network port, or a radio link for accessing a wireless customer. Based on information received in the IAM, switch 3 recognizes that the call terminates on switch 2, and hunts for a trunk to switch 2. Switch 3, then transmits another initial address message 44, which contains the number of the trunk between switch 3 and switch 2, the identity of the switch 2, the identity of the port at switch 2 connected to the called party telephone 11, and the called party number.

Switch 2, in response to receiving message 44, sends a set-up message to the terminating customers' ISDN telephone 11, which contains an identity of the channel to be used, a terminating call reference number for this call, and the called party telephone number. In response, telephone station 11 sends an alerting message, captioned with the terminating call reference number to switch 2, which forwards message 47 to switch 3 which forwards message 48 to switch 1 which forwards the alerting message 49 to the originating telephone 10. When the called party goes off-hook, a connect message is sent from telephone station 11 to switch 2, which forwards an answer message 51 to switch 3 which forwards an answer message 52 to switch 1 which forwards a connect message to the originating telephone 10. In this example, ISDN telephones were used because the ISDN telephone messages which have been standardized are very specific in their content. Similar types of messages are sent for other calls between other types of customer devices.

The database may be thought of as a relational database wherein data can be accessed using any one of several accessing keys. The called number, or equivalent, translation, (access identifier translation), is accessed when attempting to complete a call. The street address to switch and port number translation is accessed when service is provided and/or installed for a customer, or when a customer's translation data is to be moved along with the customer, to a new address and new port. The originating port class of service translation is accessed when a caller originates a call.

For wireless stations, the terminating class of service translation indicates both the called customer's class of service and billing number, (home location register type data in GSM terms), and an indication of where the customer was last registered (VLR type information), used for routing the call to an appropriate mobile switching center and thence, paging the customer from an appropriate set of base stations.

In accordance with another aspect of Applicants' invention, when a customer moves, but wishes to retain their class information profile, this class information profile can be accessed using the customer's previous address, or if the customer retains his/her telephone number, using that telephone number, and attaching the corresponding originating and terminating data to a new switch and port identified by a new address.

The database includes a number of data sub-blocks for each customer. These are shown in FIG. 2. They are shown as a super block, not all of whose fields are populated for a particular customer; the super block, in accordance with the principles of, for example, relational databases, can be accessed from the identity of any one of several fields in the super block.

The super block includes the following data sub-blocks:

Block 201 contains the customer's "street address". This street address contains enough data to identify a particular port in a street address containing several, or many such ports, (e.g., an apartment building, a household having several lines, a CENTREX business).

Block 203 contains the identification of the switch port corresponding to that customer address.

Block 205 contains the identity of a port group for accessing a block of data, listing the ports of a port group. The translations for the port group are similar to the translations for an individual customer except that instead of listing a street address for the port group, a list of ports in the group is provided. (For administrative purposes, the street address of the port group switch can also be provided).

Block 207 contains a customer access identifier which may be a telephone number, or other handle, such as an Internet address.

Block 209 contains originating class of service data. If the billing number is different from the customer access identifier, then such a billing number would be included in the original class service data. If the customer is a mobile customer, the customer's originating class data, as stored in the HLR in the prior art, would be stored here. The originating class data would include any originating screening data such as denial of 900 calls, or denial of toll calls. The required bandwidth of calls from the originating station, would also be stored here; if the originating station can make calls requiring different bandwidths, the maximum bandwidth, presumably, would be stored here.

Block 211 stores the terminating class data for the customer. This would include any special ring associated with the customer's called number, special bandwidth requirements or limitations, billing number for cases in which the called number is billed, (e.g., 800 type service), or is billed for part of the call (mobile service).

Super Block 250 is for a port group block. The block contains a port group identifier 251, and a plurality of port numbers 252, . . . , 253. Along with the port number is stored the busy/idle status of that port.

There are similar Super Blocks, (not shown), for listing the devices of a multiline trunk group, the group of attendants (who may be connected to different switches) serving as agents for a business or other customer, and the group of trunks for accessing another carrier. For these translations, busy/idle status is also desirable.

Another important relation is that between street address and port. This allows a customer to specify a street address and activate the port connected to that address. This is useful for both moves, and initial customer installations.

Another important relation is that between a device and a street address. This allows a customer to move a device to a different location for receiving and originating calls.

Among the important relations are the relation between a person, generally identified by an access identifier, e.g., Personal Identification Number, (PIN), Password Fingerprint, and a device. This permits a user to log in at any device, and subsequently, originate or receive calls at that device. The most obvious example of the use of this facility is for attendants working in a call center.

While in this preferred embodiment of a relational database, translations from any identifier to any other identifier are possible, the speed of making certain translations should be optimized. Specifically, translations between access identifier and port identity, and translations from port identity to class of service should be optimized since these translations are used on every call. Translations involving a street address are used less often and can be slower and/or more indirect.

In accordance with another feature of Applicants' preferred embodiment, an alternative access identifier such as a character string defining the name, e-mail address, or other handle of the destination customer can be used for accessing the data in the common database. Advantageously, this arrangement allows customers, such as Internet customers, to have calls delivered to a telephone device without requiring a caller to provide a POTS number, and without requiring a POTS number to be assigned to those customers. This type of arrangement also allows, for example, the highly flexible type of routing available today only to a few selected customers, such as 800-type customers, to be made available to all customers. Priority services can be provided to any customer. Call forwarding service can be provided without first routing a call to the switch serving the home base of a station. Advantageously, this permits the calls be routed, when necessary, via a Vocoder to translate between pulse code modulated, (PCM), voice signals, and packetized voice signals; the latter can be used for communicating with customers such as Internet customers who receive their voice messages as data packets.

When a switch receives the identity of the destination switch (either the switch connected to the called customer, or the switch to be used for accessing a different carrier), the receiving switch will use normal routing methods to reach the destination switch. These normal routing methods include the methods of the prior art such as real time network routing, or the dynamic non-hierarchical routing, or any new routing scheme which is introduced at a later time can be used.

While in theory, it is possible for the database to keep track of the busy/idle status of all inter-office trunks of the network, in practice, such an arrangement has been rejected in the past for good reason. However, for the special case in which a different carrier is accessed, or for the case in which one of a large number of agents possibly served by different switches is being accessed, it is desirable to have the busy/idle status of the various links for accessing the other carrier, or an agent available at the centralized database.

The identity of another carrier for securing a called customer is provided with the translation for that called customer. The identity can then be used to find a block of information for accessing that carrier, or a sub-block for accessing that carrier in an optimal manner, to establish a connection to the specific called customer. For example, one or more access switches for accessing the other carrier can be specified, an d trunk groups from these access switches can be further specified.

In accordance with Applicants' preferred embodiment, since it is unlikely that any single database will be able to handle all the traffic required in a large network, the conceptual single database is split up into a plurality of databases, and operates as a distributed database. Each of the members of the distributed database stores data for a discrete sub-set of the customers' carriers and agent groups. A relatively straightforward initial database inquiry can then be used to select the specific database which contains the information for the desired customer. In the special case wherein a terminating customer is being served by a different carrier, it may be necessary to access the initial database for finding out information about that customer, and the second database for finding information about accessing the different carrier.

In accordance with another embodiment of Applicants' invention, the database responds to the query from the originating switch by making the same translations, but using these translations to generate an enhanced initial address message, and transmitting that enhanced initial address message 60 directly to the terminating switch, or transmitting an enhanced initial address message 61 directly from the originating switch 1 to the terminating switch 2. The enhanced initial address message includes an identification of the originating switch, and an identification of the call so that the terminating switch can respond by initiating steps toward setting up a call to the originating switch. The steps for setting up such a call include the equivalent of an initial address message, except that the message is marked in such a way that an alerting signal is not sent to the caller. This type of arrangement is somewhat more efficient than the arrangement of the preferred embodiment since the equivalent of acknowledgment messages is bypassed because the originating switch can use the request to set up the call as the equivalent of a positive acknowlegment that the initial address message and other such messages were, in fact, successfully transmitted to the terminating switch. The preferred embodiment is proposed herein because it causes a lesser disruption in presently existing software than the alternative embodiment.

For the case in which the customer is served by an Internet device, that customer is connected to the public switched telephone network through an Internet server. If the Internet server recognizes that an origination from the customer's Internet device is to be switched by the public switched telephone network, the Internet server connects the customer to the public switched telephone network at a particular switch and port. Associated with that port are translations specifying the services to be offered to that customer. The Internet server also provides a called telephone number which may be for another Internet device, or a telephone. The public switched telephone network then establishes a connection to the called customer in accordance with the principles described herein. If the called customer is another Internet device, then the public switched telephone network is connected to a second Internet server for connection to the called Internet device.

The above description is of one preferred embodiment of Applicants' invention. Other embodiments will be apparent to those of ordinary skill in the art. The invention is only limited by the attached Claims.

What is claimed is:

1. A method of establishing a telecommunications connection between a calling party, and a called party, comprising the steps of:

the calling party providing to a first switch, signals specifying an access identification of the called party;

the first switch providing the identifying information to a database shared by a plurality of switches of a telecommunications network;

if the called party is served by said telecommunications network, the database providing the identity of a terminating switch, and of a port or port group accessible by the terminating switch for accessing the called party; and transmitting to the terminating switch, a signaling message comprising the identity of said port or port group; and attempting to complete the call using the information provided by said database;

wherein changes of assignment of telephone number or other access identifiers to Customer Premises Equipment require the updating of only a single database;

wherein the terminating switch does not supply a telephone number or other access identifier to port identification translation.

2. The method of claim 1, wherein if said called party is served by another carrier, said database providing an identity of a switch for accessing the carrier serving said called party, and a port group on said switch for accessing the carrier.

3. The method of claim 2, wherein said database maintains a busy/idle status of ports on one or more switches for accessing said other carrier, and wherein, said database provides an identity of a selected access switch and a selected port on said access switch for accessing said another carrier;

wherein said database controls traffic to different ones of said access switches.

4. The method of claim 1, further comprising the steps of:

providing data in said database for associating a port serving a street address with an access identifier of a customer whose service is being activated at said address.

5. The method of claim 1, wherein said database provides switch and port information for routing a call to a specific port for accessing a customer accessed via a special access code.

6. The method of claim 1, wherein said database maintains a record of the most recent location in which a mobile telecommunications station was registered, further comprising the step of:

providing an identification of a mobile switching center for routing calls to said mobile telecommunication station.

7. The method of claim 1, wherein said signals specifying an access identifier comprise signals for specifying a handle different from a telephone number of a called party.

8. The method of claim 7, wherein said handle is a character string.

9. The method of claim 1, wherein said database provides calling party originating class translation information.

10. The method of claim 1, wherein said database provides calling party billing information.

11. The method of claim 1, wherein said database provides called party terminating class translation.

12. The method of claim 1, wherein said database is a distributed database comprising a plurality of segments further comprising the step of:

storing data for a discrete subset of customers served by said database in each segment of said database.

13. The method of claim 1, wherein said database is a distributed database.

14. The method of claim 13, wherein said distributed database has entries for a discrete subset of customers of said telecommunications network in each segment of said distributed database, wherein each segment stores data for a different non-overlapping group of customers.

15. The method of claim 1, wherein the step of attempting to complete the call comprises the steps of:

transmitting the provided information to the first switch;

the first switch extending the call toward the terminating switch, and providing in call set-up messages, an identity of the terminating switch and a port of the terminating switch used for accessing the called party.

16. The method of claim 1, wherein the step of attempting to complete the call further comprises the step of:

sending a message from the database to the terminating switch, the message comprising an identity of a port or port group in the terminating switch for accessing the called party, and an identity of said first switch.

17. The method of claim 1, wherein the database maintains a busy/idle status of one or more ports for accessing the called party.

18. The method of claim 17, wherein the step of attempting to complete the call is aborted if the busy/idle status of the called party is "busy".

19. The method of claim 16, wherein the step of attempting to complete the call further comprises the step of:

said terminating switch attempting to initiate establishment of a connection toward the first switch from said port for accessing said called party.

20. The method of claim 1, wherein the step of attempting to complete the call comprises:

transmitting the provided information to the first switch;

the first switch transmitting a message to the terminating switch, the message comprising an identity of the port in the terminating switch for accessing the called party, and an identity of said first switch.

21. The method of claim 20, wherein the step of attempting to complete the call comprises the step of:

said terminating switch attempting to initiate establishment of a connection toward the first switch from said port for accessing said called party.

22. The method of claim 1, wherein said port or port group comprises any of a line port connected to a customer line, a trunk port connected to a Private Branch Exchange (PBX), a group of ports to a PBX or multiline hunt group, and a line port connected to a subscriber loop carrier served by said terminating switch.

23. The method of claim 1, wherein said terminating switch is a mobile switching center and said identity of a port is an identification for controlling paging of a wireless station.

24. In a telecommunication network, apparatus for establishing a telecommunications connection between a calling party, and a called party, comprising:

a first switch;

means for providing to a first switch, signals from a calling party specifying an access identifier of the called party;

means for providing the identifying information from said first switch to a database shared by a plurality of switches of said telecommunications network;

if the called party is served by said telecommunications network, means for receiving from the database the identity of a terminating switch, and of a port, or port group accessible by the terminating switch for accessing the called party; and transmitting to the terminating switch, a signaling messages comprising the identity of said port or port group; and in said first switch, means for attempting to complete the call using the information provided by said database;

wherein changes of assignment of telephone number or other access identifiers to Customer Premises Equipment require the updating of only a single database;

wherein the terminating switch does not supply a telephone number or other access identifier to port identification translation.

25. The apparatus of claim 24, wherein if said called party is served by another carrier, further comprising means for receiving from said database an identity of a switch for accessing the carrier serving said called party, and a port group on said switch for accessing the carrier.

26. The apparatus of claim 25, wherein said database maintains a busy/idle status of ports on one or more switches for accessing said other carrier, and further comprising means for receiving from said database an identity of a selected access switch and a selected port on said access switch for accessing said another carrier;

wherein said database controls traffic to different ones of said access switches.

27. The apparatus of claim 24, further comprising:

means for receiving data from said database for associating a port serving a street address with an access identifier of a customer whose service is being activated at said address.

28. The apparatus of claim 24, further comprising:
means for receiving from said database switch and port information for routing a call to a specific port for accessing a customer accessed via a special access code.

29. The apparatus of claim 24, further comprising:
means for receiving from said database a record of the most recent location in which a mobile telecommunications station was registered, and for receiving an identification of a mobile switching center for routing calls to said mobile telecommunication station.

30. The apparatus of claim 24, wherein said signals specifying an access identifier comprise signals for specifying a handle different from a telephone number of a called party.

31. The apparatus of claim 30, wherein said handle is a character string.

32. The apparatus of claim 24, wherein said database provides calling party originating class translation information.

33. The apparatus of claim 24, wherein said database provides calling party billing information.

34. The apparatus of claim 24, wherein said database provides called party terminating class translation.

35. The apparatus of claim 24, wherein said database is a distributed database comprising a plurality of segments and data for a discrete subset of customers served by said database, and is stored in each segment of said database.

36. The apparatus of claim 24, wherein said database is a distributed database.

37. The apparatus of claim 36, wherein said distributed database has entries for a discrete subset of customers of said telecommunications network in each segment of said distributed database, wherein each segment stores data for a different non-overlapping group of customers.

38. The apparatus of claim 24, wherein the means for attempting to complete the call comprises:
means for transmitting the provided information from said database to the first switch; and
means for extending the call from said first switch toward the terminating switch, and providing in call set-up messages, an identity of the terminating switch and a port of the terminating switch used for accessing the called party.

39. The apparatus of claim 24, wherein said means for attempting to complete the call further comprises:
means for sending a message from the database to the terminating switch, the message comprising an identity of a port or port group in the terminating switch for accessing the called party, and an identity of said first switch.

40. The apparatus of claim 24, wherein the database maintains a busy/idle status of one or more ports for accessing the called party.

41. The apparatus of claim 40, wherein the means for attempting to complete the call will abort the attempt if the busy/idle status of the called party is "busy".

42. The apparatus of claim 39, further comprises:
means in said terminating switch for attempting to initiate establishment of a connection toward the first switch from said port for accessing said called party.

43. The apparatus of claim 24, wherein the means for attempting to complete the call comprises:
means for transmitting the provided information to the first switch; and
means for transmitting a message to the terminating switch, the message comprising an identity of the port in the terminating switch for accessing the called party, and an identity of said first switch.

44. The apparatus of claim 43, further comprising:
means in said terminating switch for attempting to initiate establishment of a connection toward the first switch from said port for accessing said called party.

45. The apparatus of claim 24, wherein said port or port group comprises any of a line port connected to a customer line, a trunk port connected to a Private Branch Exchange (PBX), a group of ports to a PBX or multiline hunt group, and a line port connected to a subscriber loop carrier served by said terminating switch.

46. The apparatus of claim 24, wherein said terminating switch is a mobile switching center and said identity of a port is an identification for controlling paging of a wireless station.

* * * * *